United States Patent [19]

Quick et al.

[11] Patent Number: 5,415,766
[45] Date of Patent: May 16, 1995

[54] TRAVELING WATER SCREEN INCLUDING BOOT SEAL

[75] Inventors: Michael D. Quick, Oconomowoc; Robert R. Cheesman, Waukesha, both of Wis.

[73] Assignee: Envirex Inc., Waukesha, Wis.

[21] Appl. No.: 205,027

[22] Filed: Mar. 2, 1994

[51] Int. Cl.⁶ .................. B01D 33/333; B01D 33/80
[52] U.S. Cl. .................................. 210/160; 210/400; 210/541
[58] Field of Search ............... 210/158, 159, 160, 400, 210/499, 154, 541

[56] References Cited

U.S. PATENT DOCUMENTS

| | | | |
|---|---|---|---|
| 1,514,673 | 11/1924 | Roddy | 210/160 |
| 1,732,649 | 10/1929 | Hobart | 210/160 |
| 1,913,303 | 6/1933 | Blezer | 210/160 |
| 3,868,324 | 2/1975 | Taylor et al. | 210/158 |
| 4,360,426 | 11/1982 | Wetzel | 210/160 |
| 4,582,601 | 4/1986 | Strow et al. | 210/161 |
| 5,242,583 | 9/1993 | Thomas | 210/499 |
| 5,326,460 | 7/1994 | Cheesman et al. | 210/400 |

FOREIGN PATENT DOCUMENTS 263693 1/1927 United Kingdom.

OTHER PUBLICATIONS

Rex Water Intake Screens–Complete Services And Screening Equipment For Every Water Intake Need–Bulletin 315-331-Aug. 1989-7.5m-Envirex.

*Primary Examiner*—Christopher Upton
*Attorney, Agent, or Firm*—Michael, Best & Friedrich

[57] ABSTRACT

A traveling water screen for screening debris from water flowing in a downstream direction through a channel, the traveling water screen including a sealing flexible membrane between the train of baskets and the bottom of the channel for preventing water from flowing through the boot portion of the frame between the train of baskets and the bottom of the channel.

4 Claims, 3 Drawing Sheets

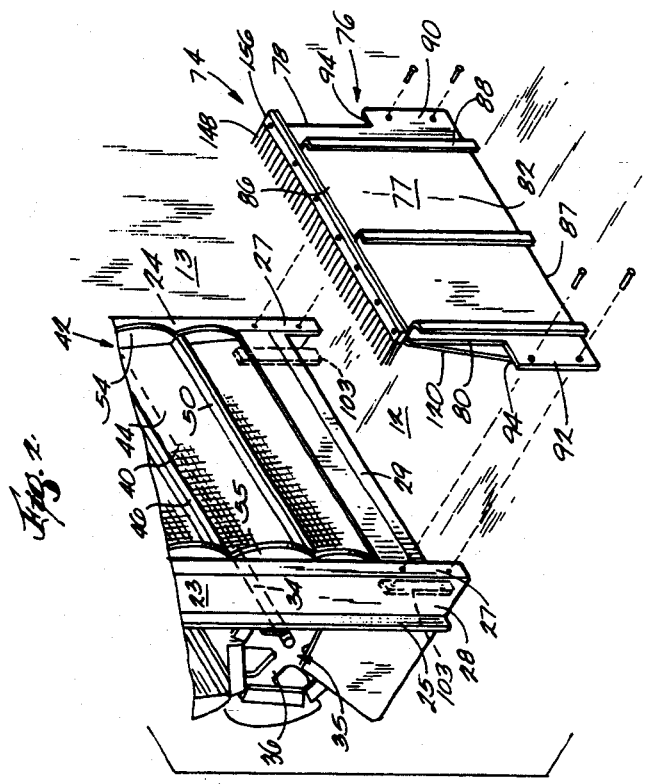
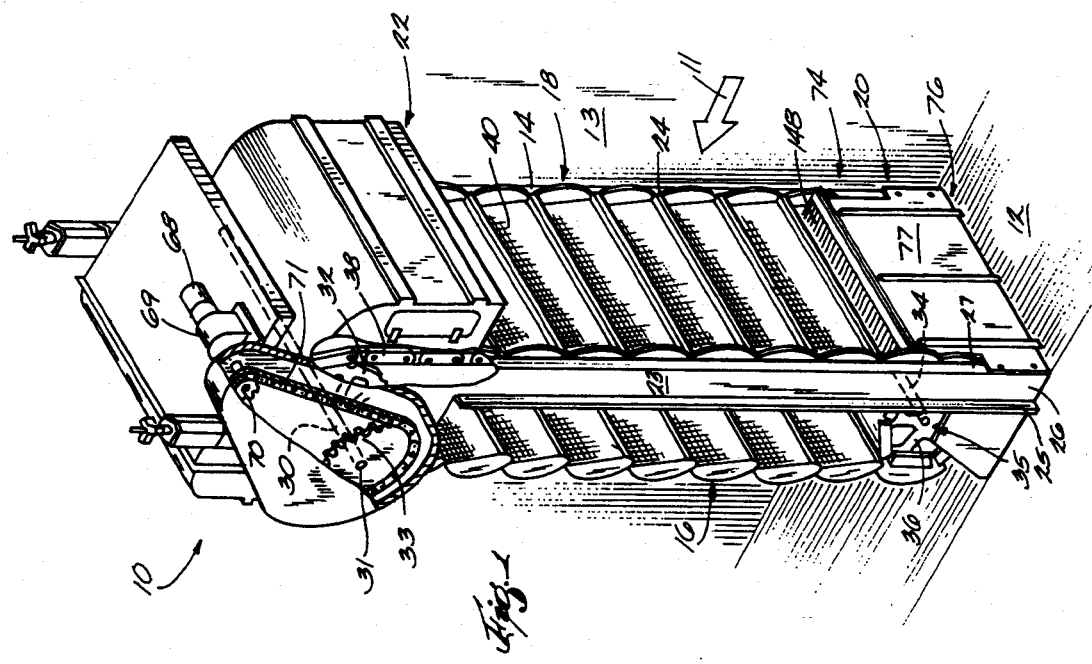

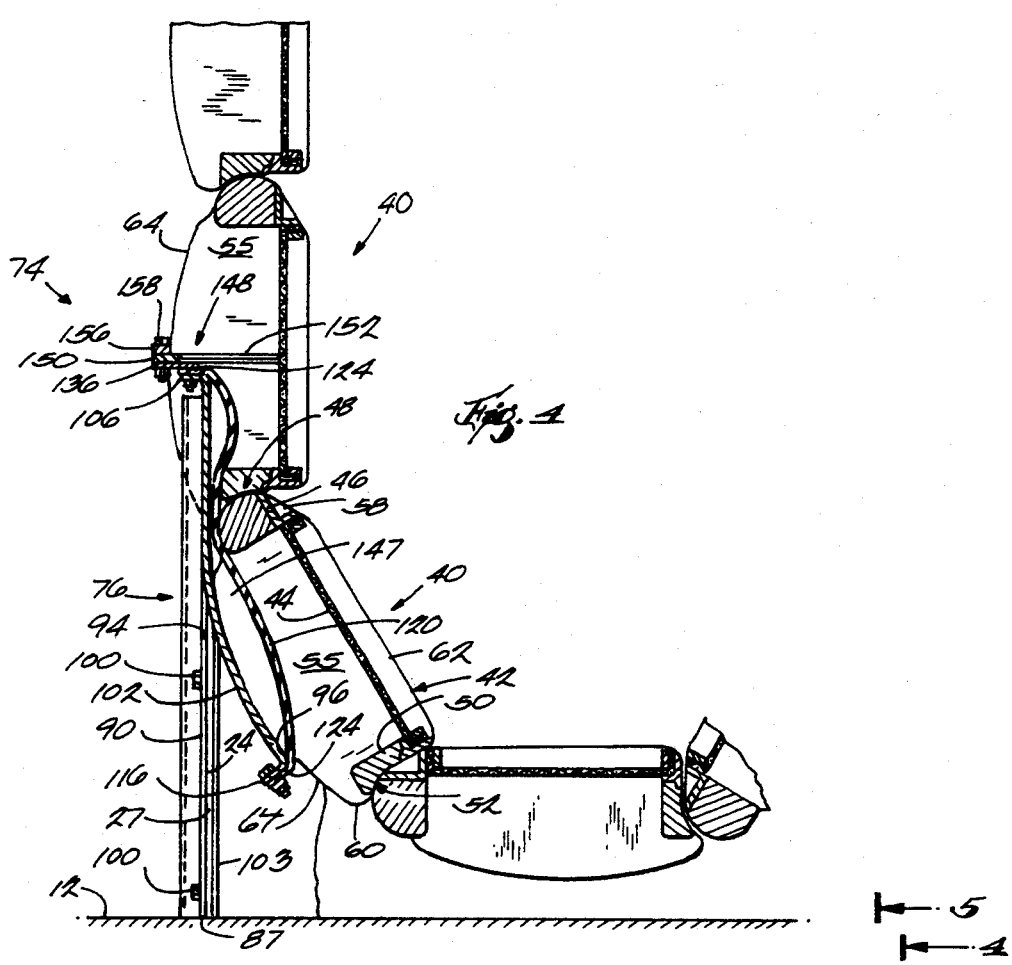
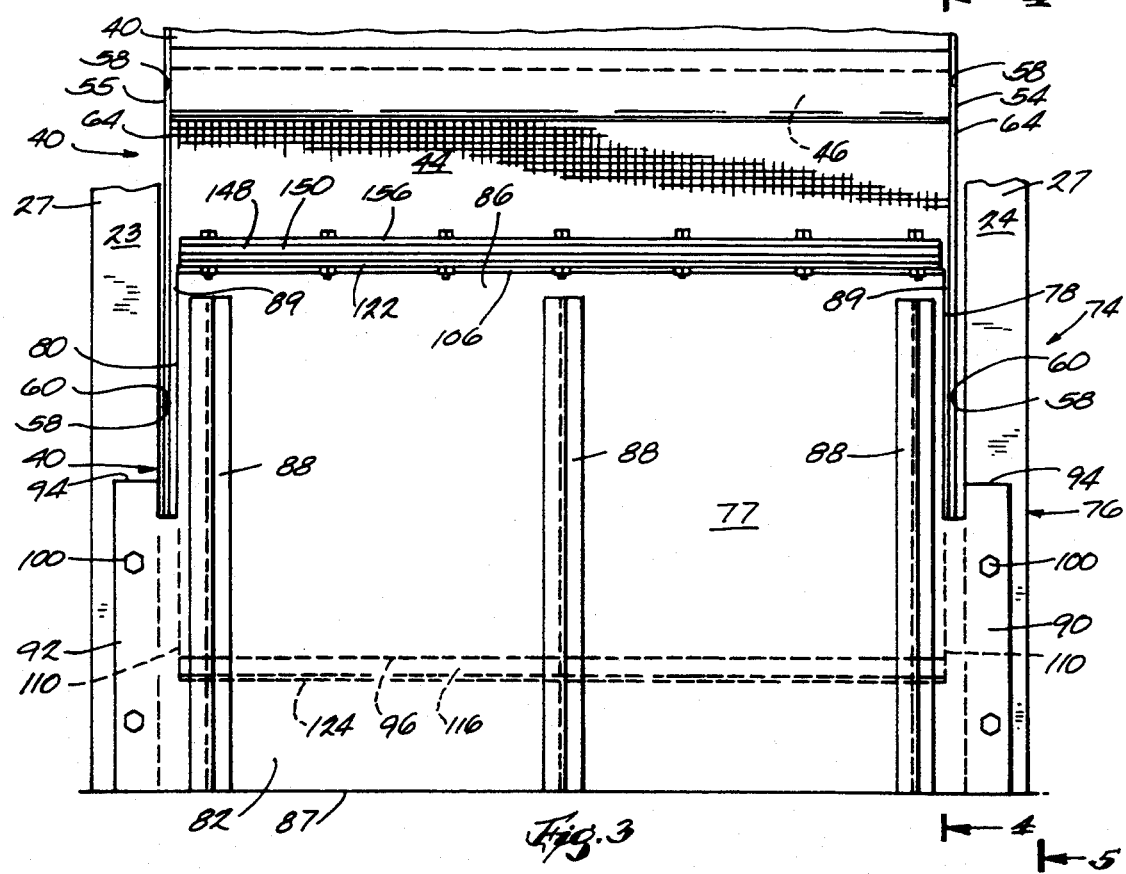

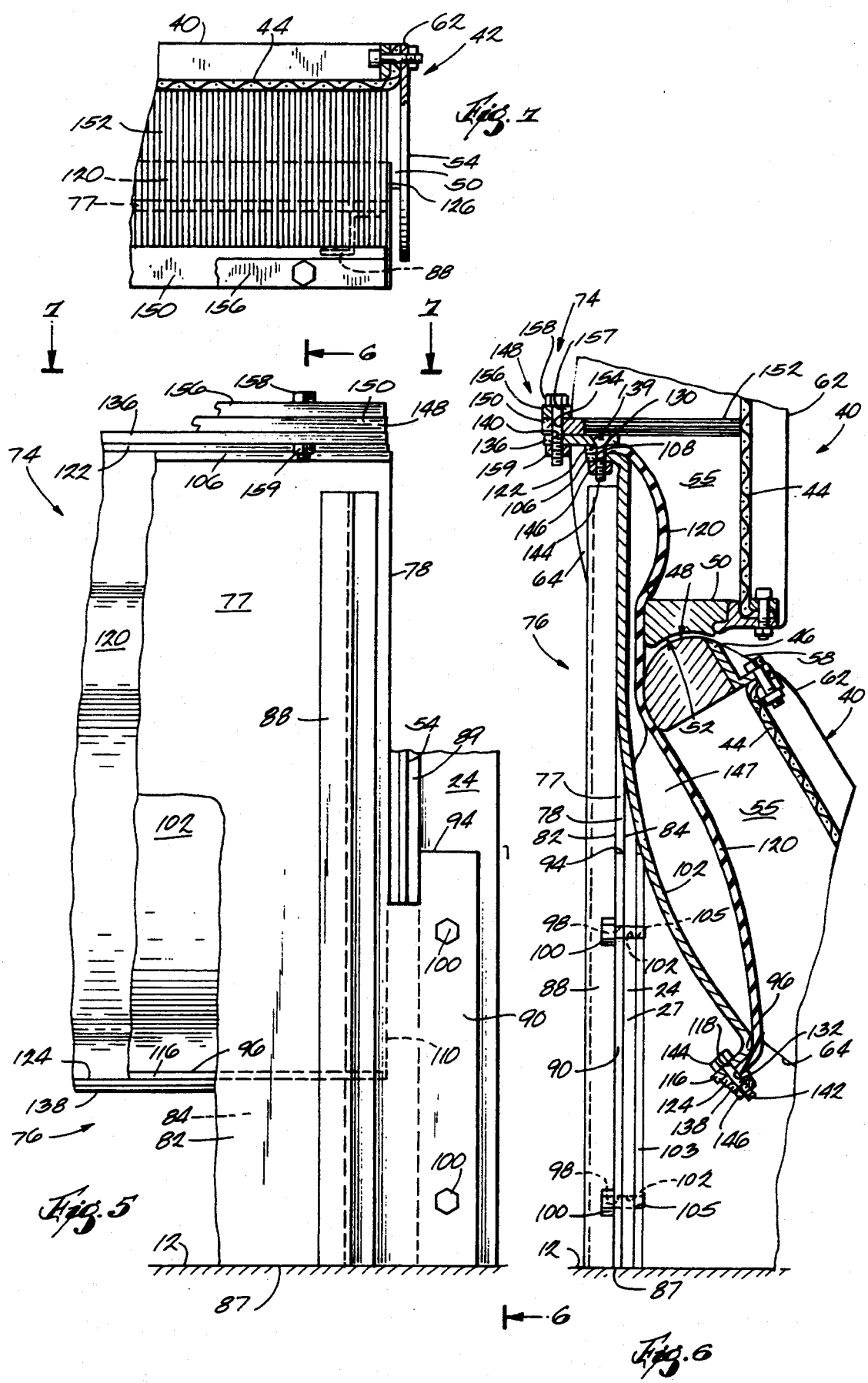

TRAVELING WATER SCREEN INCLUDING BOOT SEAL

1. Field of the Invention

The invention relates to traveling water screens for screening debris from water, and more particularly to a seal for preventing unscreened water from flowing through the boot portion of a traveling water screen.

2. Reference to Prior Art

Traveling water screens have been used for many years in applications in which it is desired to screen debris and fish from large volumes of water. A typical application is in an industrial facility or power plant which requires a large volume of cooling water. Ordinarily, water for this purpose is taken from a river or lake through an inlet water channel. Debris and fish enter the channel with the water flowing into channel and must be screened out of the water to prevent debris from clogging the condenser tubes and to prevent the fish from being killed by heat and impingement on the condenser tubes and other parts of the cooling system.

U.S. Pat. Nos. 4,582,601; 4,360,426 and 3,868,324 illustrate traveling water screens. As shown therein, a traveling water screen typically includes an upright frame having a pair of spaced vertical support members. The support members are mounted adjacent the opposed sides of the water inlet channel, such that water flowing through the channel cannot flow around the sides of the water screen. The frame includes a boot portion adjacent the bottom of the channel and a head portion above the level of the water in the channel. A head shaft is supported for rotation at the head portion of the frame, and a drive motor is connected to the head shaft. A foot shaft is supported for rotation at the boot portion. Screen baskets are arranged in a continuous train and supported for movement about a circuitous vertical path defined around the head and foot shafts. On the upstream side of the frame, the train of screen baskets moves upwardly from the foot shaft toward the head shaft, thereby forming a substantially continuous upwardly moving screen on the upstream side of the frame. At the boot portion of the frame, a curved boot plate extends between the support members and is spaced from the foot shaft and the screen baskets moving therearound. One problem with prior art traveling water screens is that unscreened water passes through the boot portion of the frame between the boot plate and the baskets moving around the foot shaft. Additionally, in some applications grit or debris collects in the boot portion of the traveling water screen. This can cause wear of the moving screens and in some cases can obstruct movement of the moving screens.

SUMMARY OF THE INVENTION

The invention provides a traveling water screen including sealing means for preventing unscreened water from flowing through the boot portion of the frame between the train of baskets and the bottom of the channel.

More particularly, the invention provides a traveling water screen for screening debris from water flowing through a channel. The traveling water screen includes a frame having a downstream side and an upstream side, a boot portion adjacent the bottom of the channel and a head portion. The traveling water screen also includes a plurality of screen baskets which are arranged in a continuous train and supported for movement about a circuitous path around head and foot shafts. The screen baskets move upwardly from the foot shaft toward the head shaft and thereby form a substantially continuous upwardly moving screen on the upstream side of the frame. The traveling water screen also includes sealing means between the train of baskets and the bottom of the channel for preventing water from flowing through the boot portion of the frame between the train of baskets and the bottom of the channel.

The sealing means includes a vertical dam member upstream of the upwardly moving train of baskets at the boot portion of the frame. The dam member extends between the support members and prevents water from passing through the frame between the support members, the upper edge portion of the dam member, and the bottom of the channel. The sealing means also includes a flexible member or membrane extending between the support members and supported by the dam member. The face of the flexible membrane contacts and sealing engages the upwardly moving train of baskets and thereby prevents water from passing between the upper edge portion of the dam member and the train of baskets. In one embodiment, the dam includes a vertical plate and a boot plate extending from the vertical plate, and the flexible membrane extends between the upper edge portion of the vertical plate and the lower edge portion of the boot plate and contacts the upwardly moving train of baskets therebetween. In one embodiment, the sealing means also includes a horizontally extending brush seal mounted at the upper edge portion of the dam member and adapted to engage the upwardly moving baskets for preventing debris from passing through the frame between the upper edge portion of the dam member and the train of baskets.

Other features and advantages of the invention will become apparent to those skilled in the art upon review of the following detailed description, claims and drawings.

BRIEF DESCRIPTION OF THE DRAWINGS

FIG. 1 is a perspective view of a traveling water screen embodying the invention.

FIG. 2 is an enlarged, exploded view of the boot portion of the traveling water screen illustrated in FIG. 1.

FIG. 3 is an enlarged partial front view of the traveling water screen shown in FIG. 1.

FIG. 4 is a cross-sectional view taken generally along line 4—4 in FIG. 3.

FIG. 5 is an enlarged view, partially broken away, of a portion of FIG. 3.

FIG. 6 is a partial cross-sectional view taken generally along line 6—6 in FIG. 5.

FIG. 7 is a plan view taken generally along line 7—7 in FIG. 5.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF A PREFERRED EMBODIMENT

Illustrated in FIG. 1 is a water screen 10 for screening debris from water flowing in a downstream direction, as indicated by the direction of the arrow 11 in FIG. 1, through a channel (not shown). The channel has a bottom 12 and a pair of spaced, vertical side walls 13 (one shown).

As shown in FIG. 1, the water screen 10 comprises an upright or vertical frame 14. The frame 14 has a downstream side 16 facing in the downstream direction and an opposed upstream side 18 facing in the upstream direction. The frame 14 also has a boot portion 20 adjacent the bottom of the channel and a head portion 22 above the level of the water (not shown) in the channel. The frame 14 includes a pair of spaced, parallel vertical support members 23 and 24. In the illustrated embodiment of the invention, each of the support members 23 and 24 has an outwardly extending flange 25 (one shown) adapted to fit into a guide slot (not shown) in the channel side wall to hold the traveling water screen in place. The support members 23 and 24 also each include an inwardly extending flange or wall 27. The frame 14 also includes an elongated, horizontally extending bottom brace member 29 which extends between the vertical support members 23 and 24.

The traveling water screen 10 (see FIG. 1) also includes a head shaft 30 supported on the head portion 22 of the frame 14 for rotation about a horizontal axis. The head shaft 30 has opposed end portions 31 (one shown). A head sprocket 32 (one shown) is mounted on each of the opposed end portions 31 of the head shaft 30. A driven sprocket 33 is also mounted on the head shaft 30 to drive the head shaft and head sprockets 32.

The water screen 10 also includes a foot shaft 34 supported on the boot portion 20 of the frame 14 for rotation about a horizontal axis. The foot shaft 34 has opposed end portions 35 (one shown). A foot sprocket 36 (one shown) is mounted at each of the opposed end portions 35 of the foot shaft 34. A pair of continuous chains 38 (one shown) are trained around the head and foot sprockets 32 and 36 at each of the respective end portions 31 and 35.

The traveling water screen 10 also includes a plurality of screen baskets 40. As best shown in FIGS. 1-4 and 6, each of the screen baskets 40 includes a frame 42 and a rectangularly shaped mesh screen 44. The frame 42 includes an elongated upper lip beam 46 having a convex outer surface 48 and a lower lip beam 50 having a concave outer surface 52. The lip beams 46 and 50 are attached at their ends to respective right and left end plates 54 and 55. The right and left end plates 54 and 55 are mirror images of each other. Each of the end plates 54 and 55 has an upper edge portion 58 shaped identically to the outer surface 48 of the upper lip beam 46 and a lower edge portion 60 shaped identically to the outer surface 52 of the lower lip beam 50. Each of the end plates 54 and 55 has a rear edge portion 62 and an opposed front edge portion 64. Each of the end plates 54 and 55 is adjacent and spaced inwardly from the inner portion of a respective one of the support members 23 or 24. The screen baskets 40 are mounted on the chains 38 and are arranged in close edge-to-edge relation in a continuous train. The screen baskets 40 are supported by the chains 38 for movement about a circuitous path defined around the head and foot shafts 30 and 34. The screen baskets 40 move downwardly from the head shaft 30 toward the foot shaft 34 on the downstream side 16 of the frame 14. The screen baskets 40 move upwardly from the foot shaft 34 toward the head shaft 30 and thereby form a substantially continuous upwardly moving screen on the upstream side 18 of the frame 14.

As best shown in FIG. 1, the traveling water screen 10 also includes means for moving the train of baskets 40 about the path around the head and foot shafts 30 and 34. Although other arrangements for moving the train of baskets 40 are possible, in the illustrated embodiment the means for moving the train of baskets 40 includes a drive motor 68. The drive motor 68 is operably connected to a gear reducer 69 having a drive sprocket 70 mounted thereon. The drive sprocket 70 is operably connected by a drive chain 71 to the driven sprocket 33 mounted on the head shaft 30. The drive motor 68 rotates the head shaft 30 and the head sprockets 32 mounted thereon, and thereby moves the chains 38 and the train of baskets 40 about the circuitous path defined around the head and foot shafts 30 and 34.

The traveling water screen 10 also includes sealing means 74 between the train of baskets 40 and the bottom of the channel for preventing water from flowing through the boot portion 20 of the frame 14 between the support members 23 and 24, the train of baskets 40 and the bottom of the channel. Although the sealing means 74 could have other constructions, in the specific embodiment of the invention illustrated in the drawings the sealing means 74 includes a vertical dam 76. The dam 76 extends between the support members 23 and 24, and includes a vertical plate 77. The vertical plate 77 includes opposed right and left side edge portions 78 and 80, opposed upstream and downstream surfaces 82 and 84, opposed upper and lower edge portions 86 and 87, and three spaced stiffeners 88. As best shown in FIGS. 3-7, in the particularly embodiment of the invention shown in the drawings the upper edge portion 86 of the vertical plate 77 includes a horizontally extending upper flange 106. The upper flange 106 has therein (see FIG. 6) a plurality of horizontally spaced apart mounting apertures 108 (one shown). The lower edge portion 87 extends horizontally and engages the bottom of the channel. Each of the right and left side edge portions 78 and 80 is spaced inwardly from the respective support member 23 and 24, such that respective spaces 89 are defined therebetween. The stiffeners 88 are spaced across the upstream surface 82 and welded thereto. One of the stiffeners 88 is adjacent each of the right and left side edge portions 78 and 80, and another stiffener 88 is spaced equally between the side edge portions 78 and 80. Each of the stiffeners 88 is an elongated member which extends vertically from the lower edge portion 87 and terminates below from the upper edge portion 86. As best shown in FIG. 7, each stiffener 88 has a generally Z-shaped cross section. Mounting arms 90 and 92 extend outwardly from the respective right and left side edge portions 78 and 80. Each of the mounting arms 90 and 92 includes an upper edge portion 94 which terminates at the respective right or left side edge portion 78 or 80. An upwardly opening notch 96 is formed in the upper edge portion 94 of each mounting arm 90 and 92. Each notch 96 is aligned with the respective space 89, and a respective basket end plate 54 or 55 projects through the notch 96 and corresponding space 89. Each of the mounting arms 90 and 92 has therein (see FIG. 6) a pair of spaced mounting apertures 98. Fasteners 100, which in the illustrated embodiment are bolts, extend through the respective mounting apertures 98 and are received in respective mounting apertures 102 in the upstream wall 27 of the respective support members 23 and 24. The bolts 100 extend through the apertures 102 in the upstream wall and are received in a backing plate 103. The backing plate 103 includes a pair of threaded apertures 105 for receiving the bolts 100 and thereby mounting the vertical plate 77 on the frame 14. Thus, the dam 76 is mounted upstream of the upwardly moving train of baskets 40 at the boot portion 20 of the frame 14, with the lower edge portion 88 abutting the bottom of the channel. The dam 76 prevents unscreened water from passing through the frame 14 between the support members 23 and 24, the bottom of the channel, and the upper edge portion 86 of the dam 104.

In the specific embodiment of the invention illustrated in the drawings the dam 76 also includes a curved boot plate 102 supported by the vertical plate 77. The boot plate 102 is spaced radially outwardly from the foot shaft 34 and the screen baskets 40 passing therearound and the surface of the boot facing baskets defines a curve about the axis of the foot shaft 34. The boot plate 102 has a lower edge portion 96, and opposed side edge portions 110 (one shown). The side edge portions 110 and 112 are spaced inwardly from the respective support members 23 and 24. The lower edge portion 96 is spaced in the downstream direction from the upper edge portion 108 and the vertical plate 77, and above the bottom 12 of the channel. The lower edge portion 96 includes a downwardly extending lower flange 116 which has therein horizontally spaced mounting apertures 118 (one shown).

The sealing means 74 also includes a flexible member 120. In the illustrated embodiment, the flexible member 120 is a rectangularly-shaped, heavy duty synthetic rubber sheet or membrane. A suitable commercially available material is ¼" thick nitrile rubber having a 55–65 durometer rating, marketed by McMaster-Carr (product no. 8635k33). The flexible member 120 has opposed upper and lower edge portions 122 and 124 and (see FIG. 7) opposed side edge portions 126 (one shown). The side edge portions 126 are spaced inwardly from the respective support members 23 and 24. The upper and lower edge portions 122 and 124 each have therein (see FIG. 6) a plurality of spaced apart apertures 130 or 132. The upper edge portion 122 is aligned with the upper flange 106 on the upper edge portion 86 of the vertical plate 77, and the apertures 130 are aligned with the mounting apertures 108 in the upper flange 106. The lower edge portion 124 is similarly aligned with the lower flange 116 on the lower edge portion 96 of the boot plate 102, so that the apertures 132 are aligned with the mounting apertures 118 in the lower flange 116. Clamping means retains the upper edge portion 122 of the flexible member 120 against the upper flange 106 and the lower edge portion 124 of the flexible member 120 against the lower flange 116. Although other suitable clamping means can be used, in the illustrated embodiment the clamping means includes upper and lower clamping bars 136 and 138. The upper clamping bar 136 is an elongated, flat member having therein a row of longitudinally spaced first apertures 139 and another row of longitudinally spaced second apertures 140. The lower clamping bar 138 is an elongated, flat member having therein longitudinally spaced apertures 142. The upper edge portion 122 of the flexible member 120 is clamped between the upper flange 106 and the upper clamping bar 136 by bolts 144 retained in the aligned apertures 130, 108 and 139 by nuts 146. The lower edge portion 124 of the flexible member 120 is also clamped between the lower flange 116 and the lower clamping bar 138 by respective bolts 144 retained in the aligned apertures 132, 118 and 142 by nuts 146. Thus, as best shown in FIGS. 4 and 6, the flexible member 120 extends between the upper edge portion 86 of the vertical plate 77 and the lower edge portion 116 of the boot plate 102. A space 147 is defined between the flexible member 120, the vertical plate 77 and the boot plate 102. The upper edge portion 122 of the flexible member 120 is upstream of the upwardly moving train of baskets 40, and the lower edge portion 124 of the flexible member 120 is downstream of the upper edge portion 122. Thus, the flexible member 120 is mounted generally between the support members 23 and 24, the dam 76, and the upwardly moving train of baskets 40. The flexible member 120 is sufficiently resilient that water pressure on the upstream face of the flexible member will push the flexible member against the moving baskets (FIG. 6) and the downstream face of the flexible member will form a sliding seal against the baskets. The flexible member 120 is engaged by and is deflected in the upstream direction by the upwardly moving train of baskets 40 intermediate the upper edge portion 86 of the vertical plate 77 and the lower edge portion 116 of the boot plate 102 to provide a positive seal preventing water from passing through the frame 14 between the flexible member 120 and the portion of the train of baskets 40 contacting the flexible member 120. Thus, the flexible member 120 prevents water from passing through the frame 14 between the upper edge portion 86 of the dam 76 and the train of baskets 40.

The sealing means 74 further includes a horizontally extending brush seal member 148. Although other suitable constructions can be used, in the illustrated embodiment the brush seal member 148 includes an elongated back member 150 and a plurality of horizontally extending bristles 152 fastened to the back member 150. The back member 150 is an elongated polyethylene member having therein longitudinally spaced apertures 154. The back member 150 is mounted on the upper clamping bar 136 by a mounting bar 156. The mounting bar 156 is an elongated member having therein (see FIG. 6) seven longitudinally spaced apertures 157. The mounting bar 156 is aligned with the back member 150, so that the apertures 157 align with the apertures 154. Bolts 158 extend through the apertures 157 in the mounting bar 156, through the apertures 154 in the back member 150, through respective of the second apertures 140 in the upper clamping bar 136, and are received by nuts 159. Two rows of the bristles 152 are fastened to the back member 150 by staples (not shown) and terminate slightly spaced from the mesh screen 44 of a passing screen basket 40. In the illustrated embodiment, the bristles 152 are nylon bristles each having a diameter of about 0.075 inches. The bristles 152 are bent upwardly as the upper lip beam 46 of each screen basket 40 moves upwardly past the brush seal member 148. The bristles 153 return to a straight, horizontal orientation as the mesh screen 44 passes, and are again bent upwardly as the lower lip beam 50 passes. Thus, the brush seal member 148 is mounted on the upper edge portion 86 of the dam 76 and prevents debris from passing through the frame 14 between the upper edge portion 86 of the dam 76 and the upwardly moving train of baskets 40.

In operation, water flows in the downstream direction through the mesh screens 44 of the upwardly moving train of screen baskets 40 on the upstream side 18 of the frame 14, and is screened thereby. The dam 76 prevents unscreened water from passing through the boot portion 20 of the frame 14 between the upper edge portion 86 of the dam 76, the support members 23 and 24, the train of baskets 40 and the bottom of the channel. The flexible member 120 engages the faces of the upwardly moving train of baskets 40 and thereby prevents unscreened water from passing through the boot portion 20 of the frame 14 between the upper edge portion 86 of the dam 76 and the train of baskets 40. The brush seal member 148 prevents debris from passing through the frame 14 between the upper edge portion 86 of the dam 76 and the upwardly moving train of baskets 40. Thus, the sealing means 74 between the train of baskets 40 and the bottom of the channel prevents unscreened water and debris from flowing through the boot portion 20 of the frame 14 between the support members 23 and 24, the train of baskets 40 and the bottom of the channel.

Various features of the invention are set forth in the following claims.

What is claimed is:

1. A traveling water screen for screening debris from water flowing in a downstream direction through a channel having a bottom, said water screen comprising a frame having a downstream side facing in the downstream direction and an opposed upstream side, said frame having a boot portion adjacent the bottom of the channel and a head portion above the boot portion;

a head shaft supported at said head portion of said frame for rotation about a horizontal axis;

a foot shaft supported at said boot portion of said frame for rotation about a horizontal axis;

a plurality of screen baskets arranged in a continuous train and supported for movement about a circuitous path defined around said head and foot shafts, said screen baskets moving downwardly from said head shaft toward said foot shaft on said downstream side of said frame, and said screen baskets moving upwardly from said foot shaft toward said head shaft and thereby forming a substantially continuous upwardly moving screen on said upstream side of said frame;

means for moving said train of baskets about said path; and sealing means between said train of baskets and the bottom of the channel for preventing water from flowing through said boot portion of said frame between said train of baskets and the bottom of the channel, said sealing means including a generally vertical dam upstream of said upwardly moving train of baskets at said boot portion of said frame, said dam extending between said support members and having an upper edge portion, and said dam preventing water from passing through said frame between said support members, said upper edge portion of said dam, and the bottom of the channel, and said sealing means including a flexible membrane supported by said vertical dam, and said flexible membrane having a face adapted to contact said upwardly moving train of baskets and to prevent water from passing through said frame between said flexible membrane and said train of baskets.

2. The water screen as set forth in claim 1 and wherein said sealing means further includes a horizontally extending brush seal member mounted at said upper edge portion of said dam, said brush seal member including a plurality of bristles contacting said upwardly moving train of screen baskets and thereby preventing debris from passing through said frame between said upper edge portion of said dam and said train of baskets.

3. The water screen as set forth in claim 1 and wherein said dam includes a vertical plate having a lower edge portion adjacent the bottom of the channel, said vertical plate including an upper edge portion above said lower edge portion, and a boot plate extending from said vertical plate, and said boot plate including a lower edge portion, and said flexible member extending generally between said upper edge portion of said vertical plate and said lower edge portion of said boot plate and so as to contact said upwardly moving train of baskets intermediate said upper edge portion of said vertical plate and said lower edge portion of said boot plate.

4. The water screen as set forth in claim 3 and wherein said flexible membrane engages said upwardly moving train of baskets such that it is deflected in the upstream direction by said upwardly moving train of baskets.

* * * * *